United States Patent
Hasegawa

(10) Patent No.: US 8,231,365 B2
(45) Date of Patent: Jul. 31, 2012

(54) ELECTRIC COMPRESSOR

(75) Inventor: Takehiro Hasegawa, Isesaki (JP)

(73) Assignee: Sanden Corporation, Isesaki-shi, Gunma (JP)

( * ) Notice: Subject to any disclaimer, the term of this patent is extended or adjusted under 35 U.S.C. 154(b) by 543 days.

(21) Appl. No.: 12/159,775

(22) PCT Filed: Dec. 27, 2006

(86) PCT No.: PCT/JP2006/326008
§ 371 (c)(1),
(2), (4) Date: Jun. 30, 2008

(87) PCT Pub. No.: WO2007/074852
PCT Pub. Date: Jul. 5, 2007

(65) Prior Publication Data
US 2009/0269221 A1     Oct. 29, 2009

(30) Foreign Application Priority Data
Dec. 28, 2005  (JP) .................... 2005-377875

(51) Int. Cl.
F04B 35/04   (2006.01)
H02K 5/24    (2006.01)
H02K 11/00   (2006.01)
H01R 13/627  (2006.01)
H01R 4/38    (2006.01)
H01R 13/648  (2006.01)

(52) U.S. Cl. ......... 417/423.7; 310/51; 310/71; 439/357; 439/382

(58) Field of Classification Search ............... 417/410.1, 417/410.5, 423.7, 374; 439/382, 353, 357, 439/383, 384, 385; 310/51, 71
See application file for complete search history.

(56) References Cited

U.S. PATENT DOCUMENTS

| | | | | |
|---|---|---|---|---|
| 2,684,401 | A * | 7/1954 | Roeser | 174/153 R |
| 3,457,867 | A * | 7/1969 | Komor et al. | 417/422 |
| 3,763,460 | A * | 10/1973 | Hatschek et al. | 439/277 |
| 4,626,721 | A * | 12/1986 | Ouchi | 310/71 |
| 4,836,794 | A * | 6/1989 | Barr | 439/135 |
| 7,217,106 | B2 * | 5/2007 | Tanaka et al. | 417/410.1 |
| 2003/0152467 | A1 * | 8/2003 | Higashiyama et al. | 417/374 |
| 2004/0179959 | A1 * | 9/2004 | Hasegawa | 417/374 |
| 2004/0253124 | A1 * | 12/2004 | Ioi et al. | 417/410.1 |

* cited by examiner

Primary Examiner — Devon C Kramer
Assistant Examiner — Bryan Lettman
(74) Attorney, Agent, or Firm — Baker Botts L.L.P.

(57) ABSTRACT

An electric compressor includes a built-in electric motor for driving the compressor and a connection section between an external terminal for power supply to the electric motor and the end of a wire from a stator of the electric motor and is stored in a compressor housing. The connection section is constructed from a housing side coupler engaged with the compressor housing, a power supply-external terminal side coupler engaged with the housing side coupler, and a stator side coupler for holding the end of the wire from the stator, fitted to the power supply-external terminal side coupler, and engaged with the housing side coupler. Vibration resistance of a terminal connection section for the motor is improved and breakage and momentary electrical interruption at the terminal connection section may be prevented, with productivity of the compressor maintained at a good level.

9 Claims, 4 Drawing Sheets

ELECTRIC COMPRESSOR

CROSS-REFERENCE TO RELATED APPLICATIONS

This application is the National Stage of International Patent Application No. PCT/JP2006/326008, filed Dec. 27, 2006, which claims the benefit of Japanese Patent Application No. 2005-377875, filed Dec. 28, 2005, the disclosures of which are incorporated herein by reference in their entirety.

TECHNICAL FIELD OF THE INVENTION

The present invention relates to an electric compressor having a built-in electric motor for driving the compressor, and specifically, to a structure of a terminal connection section for the motor in the electric compressor including a hybrid compressor which is suitable for a refrigeration system for vehicles, etc.

BACKGROUND ART OF THE INVENTION

In an electric compressor having a build-in electric motor for driving the compressor, especially in an electric compressor used in a refrigeration system for vehicles, etc., because usually a high-voltage motor is used, from the viewpoint of safety and the like, a structure is required for insulating between the portions of a motor terminal part and the connection section thereof and the portions of a motor housing part and a compressor housing part (that is, a body portion), thereby removing a fear of leak. In such an electric compressor, usually, a connection section between an external terminal for power supply to the built-in electric motor and the end of a wire from a stator of the electric motor is provided, and a structure is frequently employed wherein the connection section is stored in the compressor housing, in particular, in a projected hollow portion extending outward.

Further, even in an electric compressor having a high-voltage motor used in a refrigeration system for vehicles and the like, the above-described connection section is frequently designed similarly in a compressor for general household electric equipment, and in the structure, a terminal connection section is held only by the force of a spring provided to a terminal, and therefore, generally no particular measures for vibration resistance are taken. For example, a terminal and a coupler for a compressor for general household electric equipment are used and the terminal connection section is merely pressed by a spring force, and in most cases, the terminal connection section is not fixed by fixing means like bolts. Therefore, if a great load beyond the spring force is applied, there is a possibility that breakage of the terminal connection section or momentary electrical interruption (a phenomenon that by momentary separation, an electrical connection is interrupted momentarily) may occur. Particularly, in an electric compressor mounted on a vehicle to which an external force due to vibration tends to be applied, such a problem liable to occur. However, since such a structure is simple, it is good in productivity and cost.

On the other hand, as a structure for improving vibration resistance of a motor terminal connection section, for example, as shown in FIG. 4, a structure is also known wherein a resin 103 such as epoxy is injected around a connection section between terminals of an external terminal for power supply 101 and a terminal provided on a terminal end 102 from a stator, and whereby the connection section is formed by molding. A compressor housing 104 is insulated from the terminals by this resin 103. In this structure, because the portion around the terminals is molded by the resin, although the possibility of breakage due to vibration becomes less, since coefficient of linear expansion differs between terminal (made of metal) and resin, the connection section may be deformed in a direction in which the terminals are broken, depending upon the temperature therearound. Further, although the cost for forming the connection section is low because of its simple structure, since it needs time for curing the resin in the line for production, the productivity is low.

Such problems with respect to the connection section exist not only in a simple electric compressor built in with an electric motor for driving its compression mechanism, but also in a hybrid compressor having a built-in electric motor and another external drive source different therefrom (for example, an engine for running a vehicle) as drive sources for compression mechanisms similarly.

For example, as a hybrid compressor used in a refrigeration system for vehicles and the like, a hybrid compressor is proposed wherein a first scroll-type compression mechanism driven only by a prime mover for a vehicle and a second scroll-type compression mechanism driven only by a built-in electric motor are integrally incorporated at a condition of the fixed scrolls of both compression mechanisms back to back (Patent document 1). In such a hybrid compressor, it becomes possible to operate each compression mechanism solely or both compression mechanisms simultaneously, and it becomes possible to obtain an optimum discharge performance depending on current requirements. Even in such a hybrid compressor, there exist the above-described problems on the terminal connection section for the built-in electric motor.

Patent document 1: JP-A-2003-161257

Where, in order to solve the above-described problems, although it has not been disclosed yet, an electric compressor is also proposed by the applicant of the present application wherein the vibration resistance of the terminal connection section for a motor is improved by providing a vibration resistant means, thereby preventing breakage and momentary electrical interruption at the terminal connection section and ensuring good productivity (Patent document 2).

Patent document 2: JP-A-2004-373156

DISCLOSURE OF THE INVENTION

Problems to be Solved by the Invention

Accordingly, an object of the present invention is to provide an electric compressor having a built-in electric motor which can ensure a good productivity, and can improve vibration resistance of its terminal connection section for a motor, thereby preventing occurrence of breakage and momentary electrical interruption at the terminal connection section.

Means for Solving the Problems

To achieve the above-described object, an electric compressor according to the present invention has a built-in electric motor for driving the compressor and in which a connection section between an external terminal for power supply to the electric motor and the end of a wire from a stator of the electric motor is stored in a compressor housing, and the electric compressor is characterized in that the connection section is formed from a housing side coupler engaged with the compressor housing, a power supply-external terminal side coupler engaged with the housing side coupler, and a stator side coupler for holding the end of the wire from the stator, fitted to the power supply-external terminal side coupler, and engaged with the housing side coupler. In such a structure, since the terminal connection section can be easily formed by engaging the respective couplers with one another, as compared with the aforementioned case having the injection and molding process of epoxy resin, the resin injection and molding process can be omitted, the preparation and the curing time for the resin becomes unnecessary, and the productivity can be improved.

It is preferred that a vibration resistant means for mechanically preventing at least one of wire breakage, momentary electrical interruption and breakage of an insulation member ascribed to vibration is provided at a position of the connection section. Further, by employing such a vibration resistance improving structure for the terminal connection section, breakage or momentary electrical interruption of the terminal connection section ascribed to vibration applied from outside of the compressor, and further, damage to an insulation member therearound, can be effectively prevented or suppressed, and even in a usage environmental condition applied with vibration, a stable connection state can be maintained.

As the above-described vibration resistant means, a structure having an O-ring interposed between the housing side coupler and the housing may be employed.

Further, as the above-described vibration resistant means, means having an elastic member capable of pressing the power supply-external terminal side coupler toward the inside of the compressor may be employed. Further, as the elastic member, for example, a wave washer can be used. Further, it may be structured wherein a flat washer is interposed between this wave washer and the above-described tab housing.

The above-described connection section may be formed in a projected hollow portion which is formed on the housing in that the electric motor is stored and the stator is fixed and which extends outward. This projected hollow portion can be structure to be substantially closed against outside of the compressor.

The vibration resistance improving structure for the terminal connection section according to the present invention can be applied to any type electric compressor as long as it has a built-in electric motor, and the structure can be applied also to a so-called hybrid compressor. For example, the structure can be applied to a case where the electric compressor is a hybrid compressor in which a first compression mechanism driven only by a first drive source different from the built-in electric motor and a second compression mechanism driven only by the built-in electric motor provided as a second drive source are provided in parallel and into which both compression mechanisms are incorporated integrally.

In such a hybrid compressor, for example, a structure may be employed wherein the first and second compression mechanisms are scroll-type compression mechanisms, and the fixed scrolls of both compression mechanisms are disposed back to back. These fixed scrolls disposed back to back may be formed from an integral fixed scroll member. Further, as the above-described first drive source, a prime mover for a vehicle, for example, an engine for running a vehicle or an electric motor different from the above-described built-in electric motor can be used.

Effect According to the Invention

In such an electric compressor according to the present invention, breakage or momentary electrical interruption of the terminal connection section ascribed to vibration applied from outside of the compressor, and further, damage to an insulation member therearound, can be effectively prevented or suppressed, and even in an environmental condition applied with vibration, a stable connection state can be maintained. Further, as compared with the aforementioned case having the injection and molding process of epoxy resin, because the resin injection and molding process can be omitted, the preparation and the curing time for the resin become unnecessary, and the productivity can be improved.

EXPLANATION OF SYMBOLS

Figure 1:
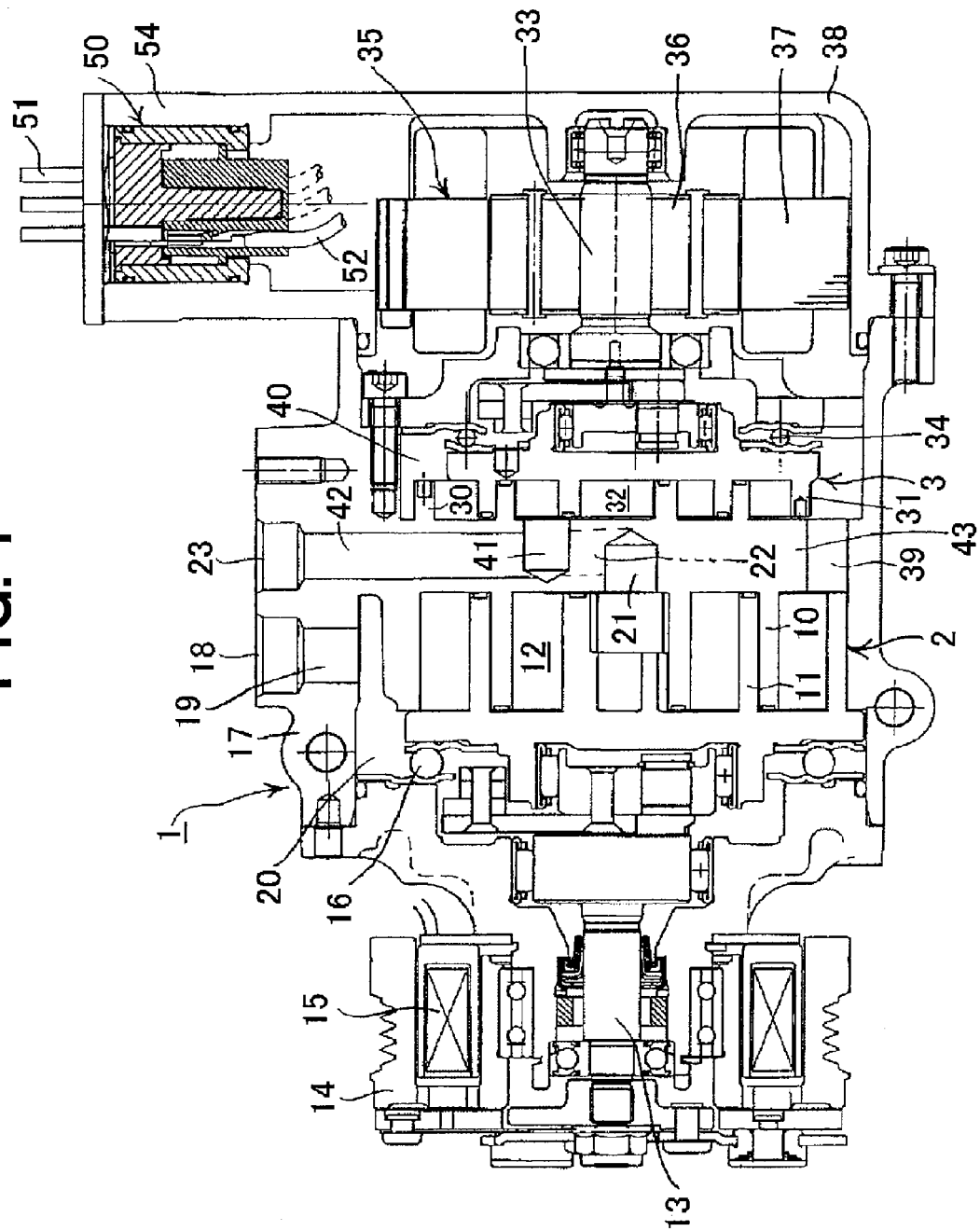
FIG. 1 is a vertical sectional view of a hybrid compressor as an electric compressor according to an embodiment of the present invention.

1: hybrid compressor
2: first compression mechanism
3: second compression mechanism
10, 30: fixed scroll
11, 31: movable scroll
12, 32: operational space
13, 33: drive shaft
14: pulley
15: electromagnetic clutch
16, 34: ball coupling
17: casing
18: suction port
19: suction path
20, 40: suction chamber
21, 41: discharge hole
22, 42: discharge path
23: discharge port
35: electric motor
36: rotor
37: stator
38: stator housing
39: communication path
43: fixed scroll member
50: terminal section
51: external terminal for power supply
52: wire
53: connection section
54: projected hollow portion
55: hermetic seal
56: engaging portion
57: housing side coupler
58, 59: groove
60, 61: O-ring
62: power supply-external terminal side coupler
63: stator side coupler
64, 65: claw
66, 67: groove
68, 69: engaging portion
70: supporting portion
71: hollow portion
72, 73: claw
74, 75: engaging portion
76: wave washer
77: flat washer

THE BEST MODE FOR CARRYING OUT THE INVENTION

Hereinafter, a desirable embodiment of the electric compressor according to the present invention will be explained referring to figures.

Figure 2:
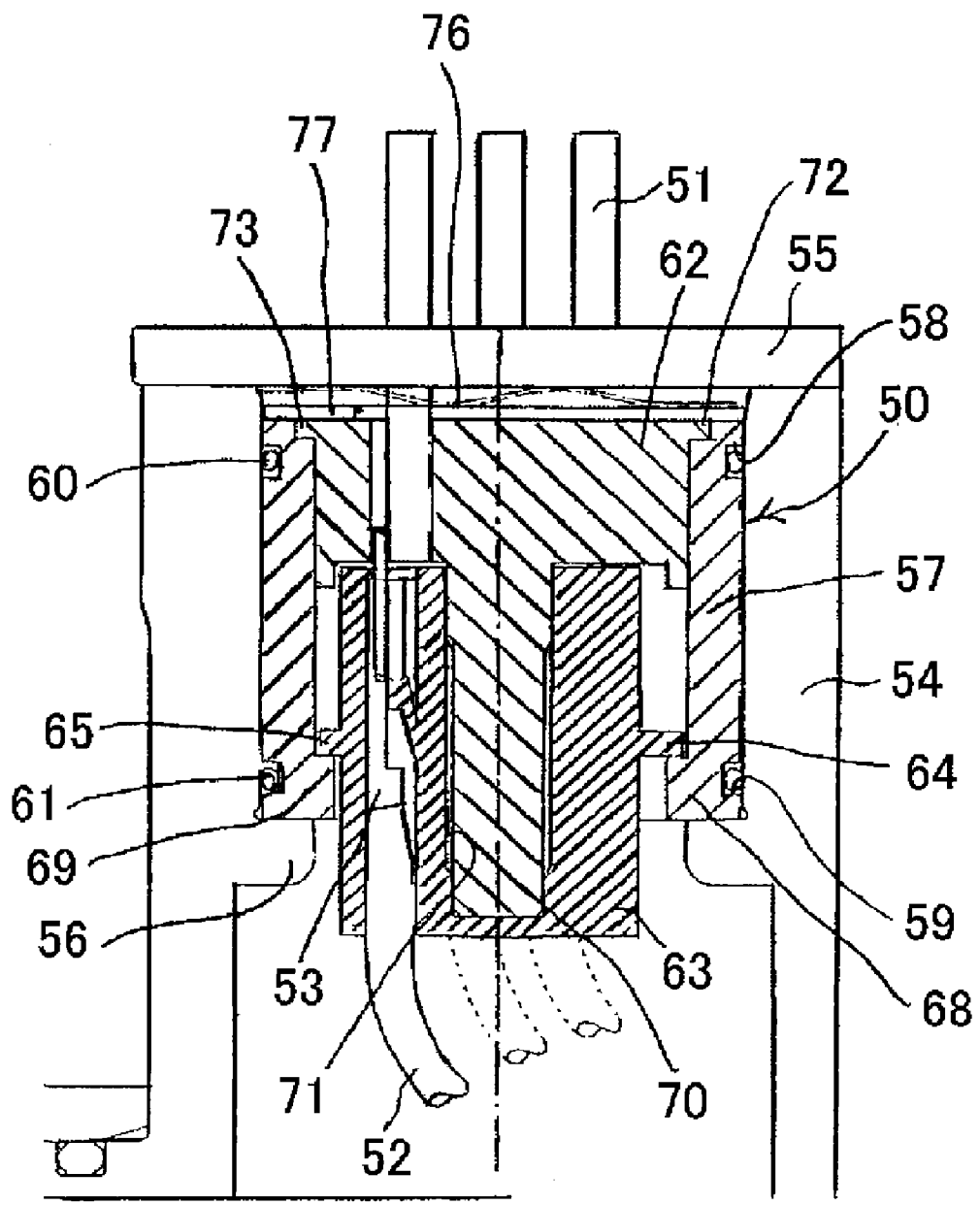
FIG. 2 is an enlarged vertical sectional view of a terminal connection section of the hybrid compressor depicted in FIG. 1.

FIG. 1 depicts an electric compressor according to an embodiment of the present invention, in particular, shows a case where the present invention is applied to a hybrid compressor. FIG. 2 depicts a structure of a terminal connection section of a built-in electric motor in the hybrid compressor depicted in FIG. 1, however, this structure shown in FIG. 2 can be applied not only to a hybrid compressor, but also to an electric compressor having only a built-in electric motor as a drive source.

First, the hybrid compressor depicted in FIG. 1 will be explained. Hybrid compressor 1 is formed as a scroll type compressor, and has a first compression mechanism 2 and a second compression mechanism 3. First compression mechanism 2 has a fixed scroll 10, a movable scroll 11 forming a plurality of pairs of operational spaces (fluid pockets) 12 by engaging with fixed scroll 10, a drive shaft 13 driving movable scroll 11 at an orbital movement by engaging with movable scroll 11, an electromagnetic clutch 15 for an on-off operation of the transmission of a driving force between a pulley 14, to which the driving force from a prime mover for running a vehicle (not shown) provided as a first drive source is transmitted, and the drive shaft 13, a ball coupling 16 for preventing the rotation of movable scroll 11, and a suction port 18 formed on a casing 17. The fluid to be compressed (for example, refrigerant gas) sucked from suction port 18 into a suction chamber 20 through a suction path 19 is taken into operational spaces 12, the operational spaces 12 are moved toward the center of fixed scroll 10 while the volumes of the operational spaces 12 are decreased, and by this operation, the refrigerant gas in the operational spaces 12 is compressed. A discharge hole 21 is formed on the central portion of fixed scroll 10, and the compressed refrigerant gas is discharged to a high-pressure side of an external refrigerant circuit through the discharge hole 21, a discharge path 22 and a discharge port 23.

On the other hand, second compression mechanism 3 has a fixed scroll 30, a movable scroll 31 forming a plurality of pairs of operational spaces (fluid pockets) 32 by engaging with fixed scroll 30, a drive shaft 33 driving movable scroll 31 at an orbital movement by engaging with movable scroll 31, and a ball coupling 34 for preventing the rotation of movable scroll 31. An electric motor 35 is incorporated in order to drive the drive shaft 33 of this second compression mechanism 3. Electric motor 35 has a rotor 36 fixed to drive shaft 33 and a stator 37, the stator 37 is fixed to a stator housing 38 or a stator housing 38 which is formed as a part of the compressor housing, and the whole of electric motor 35 is contained in the stator housing 38. In this second compression mechanism 3, the fluid to be compressed (for example, refrigerant gas) sucked from suction port 18 into suction chamber 20 of first compression mechanism 2 is sucked into a suction chamber 40 of second compression mechanism 3 through a communication path 39, the gas is taken into operational spaces 32, the operational spaces 32 are moved toward the center of fixed scroll 30 while the volumes of the operational spaces 32 are decreased, and by this operation, the refrigerant gas in the operational spaces 32 is compressed. A discharge hole 41 is formed on the central portion of fixed scroll 30, and the compressed refrigerant gas is discharged to the high-pressure side of the external refrigerant circuit through the discharge hole 41 and a discharge path 42.

In this embodiment, fixed scroll 10 of first compression mechanism 2 and fixed scroll 30 of second compression mechanism 3 are disposed back to back, and both fixed scrolls 10 and 30 are formed as an integral fixed scroll member 43.

When only first compression mechanism 2 of hybrid compressor 1 is operated, an electric power is not supplied to electric motor 35 for driving second compression mechanism 3, and the electric motor 35 is not rotated. Therefore, second compression mechanism 3 does not operate. When the hybrid compressor 1 is driven only by electric motor 35, the electric motor 35 is turned to be on and rotated, the rotation of the electric motor 35 is transmitted to drive shaft 33 of second compression mechanism 3, and the orbital movement of movable scroll 31 is performed by the drive shaft 33. At that time, electromagnetic clutch 15 of first compression mechanism 2 is not excited, and the rotation of the prime mover for running a vehicle as a first drive source is not transmitted to the first compression mechanism 2. Therefore, first compression mechanism 2 does not operate. When both first and second compression mechanisms 2 and 3 are driven simultaneously, the driving force from the prime mover for running a vehicle is transmitted to movable scroll 11 of first compression mechanism 2 as well as electric motor 35 is turned to be on and the driving force thereof is transmitted to movable scroll 31 of second compression mechanism 3.

Figure 3:
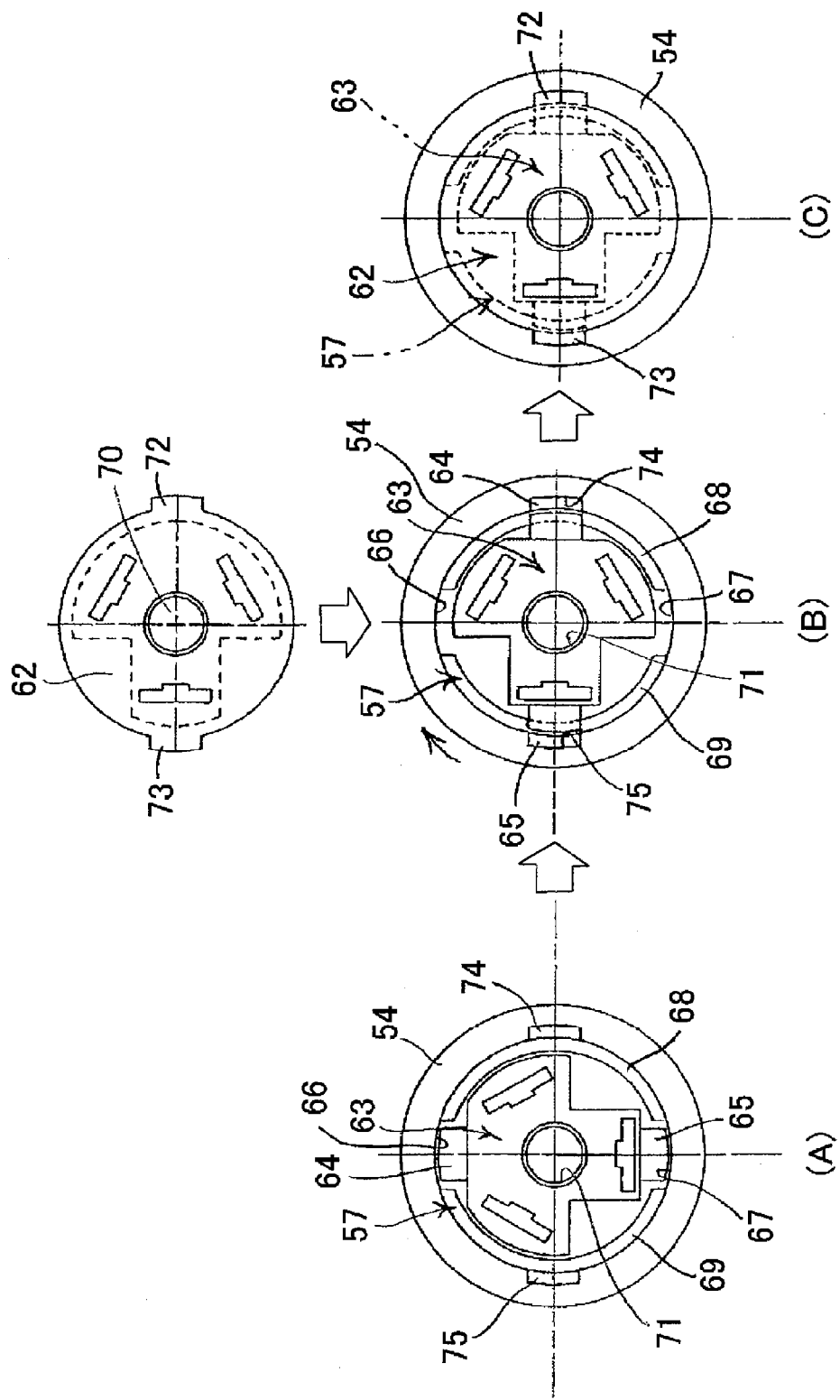
FIG. 3 is a process diagram for forming a terminal connection section of the hybrid compressor depicted in FIG. 1.
Figure 4:
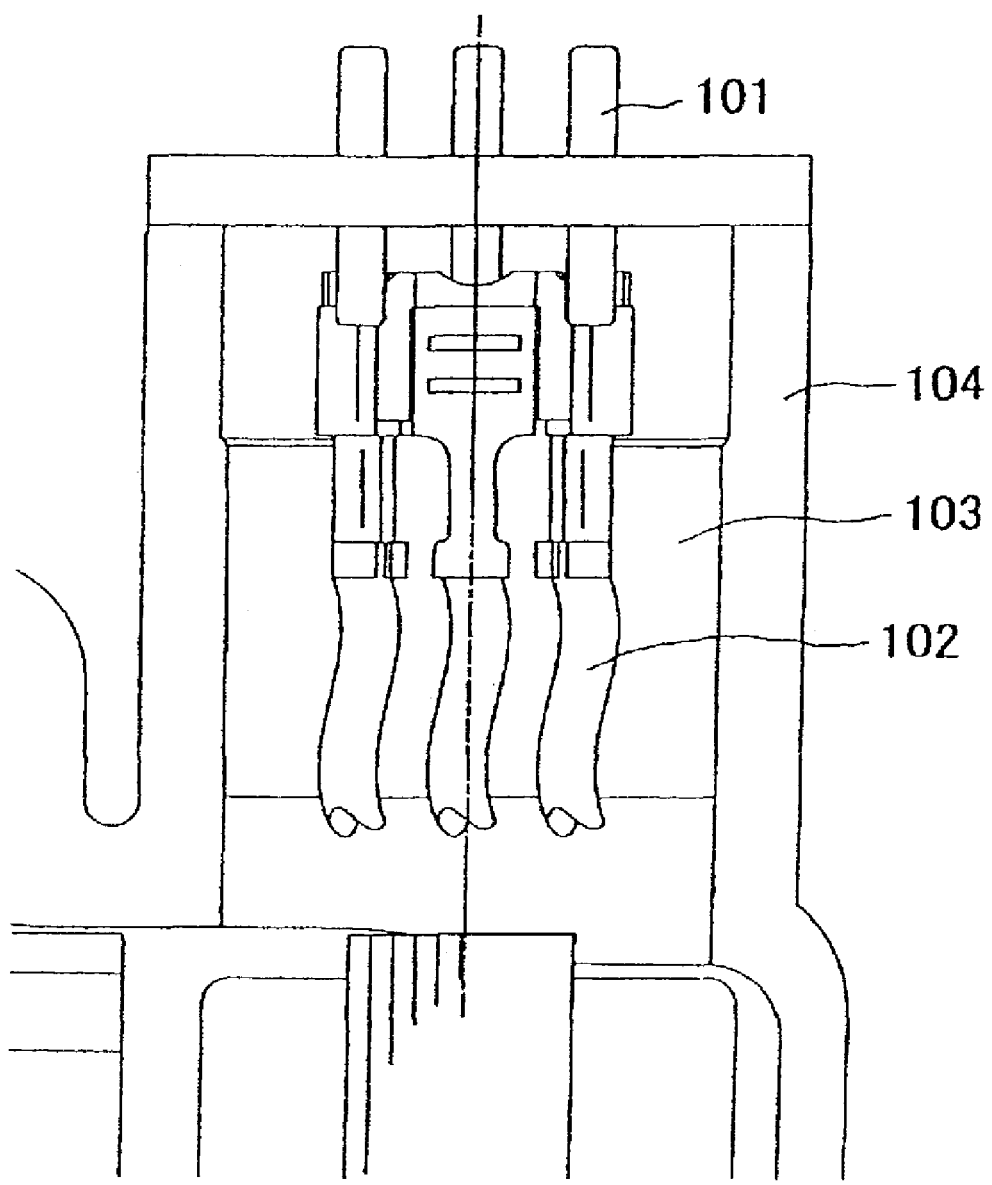
FIG. 4 is a vertical sectional view of a conventional terminal connection section injected and molded with resin.

In hybrid compressor 1 thus constructed, terminal section 50 of electric motor 35 is disposed at an upper portion of the hybrid compressor 1 which is in a mounted condition. In the detailed structure of this terminal section 50 is formed, as depicted in FIGS. 2 and 3. Terminal section 50 has a connection section 53 between an external terminal for power supply 51 for electric motor 35 and the end of a wire 52 from stator 37 of electric motor 35. Connection section 53 is disposed in a projected hollow portion 54 which is formed on stator housing 38 and extends outward, and external terminal for power supply 51 is attached to a hermetic seal 55 which substantially can close this projected hollow portion 54.

In this embodiment, an engaging portion 56 is provided on the inner wall of projected hollow portion 54, and a cylindrical housing side coupler 57 is engaged with the engaging portion 56. Grooves 58 and 59 extending in a circumferential direction are provided on the outer surface of housing side coupler 57, and O-rings 60 and 61 are fitted into the grooves 58 and 59. A power supply-external terminal side coupler 62 is engaged with housing side coupler 57. A stator side coupler 63, which holds wire 52 from stator 37 and which is engaged with housing side coupler 57, is fitted to power supply-external terminal side coupler 62. The above-described respective couplers 57, 62 and 63 are formed from resin, and the respective couplers 57, 62 and 63 are formed capable of being elastically deformed.

In this embodiment, the above-described connection section can be formed as follows. First, housing side coupler 57 is inserted into projected hollow portion 54. At that time, O-rings 60 and 61 are fitted beforehand into grooves 58 and 59 provided on the outer surface of housing side coupler 57. One end portion of housing side coupler 57 inserted into projected hollow portion 54 is engaged with engaging portion 56 provided on the inner wall of projected hollow portion 54, and located at a predetermined position. Further, the positional alignment between claws 64 and 65 formed on the outer edge of stator side coupler 63 and grooves 66 and 67 formed on housing side coupler 57 is carried out, and at this state, stator side coupler 63 is inserted from one end side (from lower side in FIG. 2) of housing side coupler 57 (FIG. 3(A)). Next, stator side coupler 63 is rotated by 90 degrees in the arrow direction (FIG. 3(B)). By this, claws 64 and 65 of stator side coupler 63 are fitted to and engaged with engaging portions 68 and 69 of housing side coupler 57. Then, a supporting portion 70 of power supply-external terminal side coupler 62 is inserted into a hollow portion 71 of stator side coupler 63 from the upper side of projected hollow portion 54 (the upper side in FIG. 2), and claws 72 and 73 of power supply-external terminal side coupler 62 are engaged with engaging portions 74 and 75 of housing side coupler 57 (FIG. 3(C)). Furthermore, a wave washer 76 is mounted on the upper portion of power supply-external terminal side coupler 62, and projected hollow portion 54 is sealed by hermetic seal 55.

In this embodiment, as described above, since housing side coupler 57 is engaged with projected hollow portion 54 (compressor housing) and further connection section 53 can be easily formed only by engaging the respective couplers with each other, as compared with the aforementioned case having an epoxy resin injecting and molding process, the resin injection and molding process can be omitted, the preparation and the curing time for the resin become unnecessary, and the productivity can be improved. Further, in this embodiment, because the couplers are formed from resins so that they can be elastically deformed, respectively, the workability for assembly can be improved.

Further, in this embodiment, as the vibration resistant means for connection section 53, the following various mechanisms are employed. First, O-rings 60 and 61 are interposed between the outer circumferential surface of housing side coupler 57 and projected hollow portion 54. These O-rings 60 and 61 mainly function for preventing a vibration of the connection section in the horizontal direction.

Further, wave washer 76 is provided as an elastic member capable of pressing housing side coupler 57 toward the inside of the compressor housing, in this embodiment, toward the inside of projected hollow portion 54 of stator housing 38. This elastic member may be a member other than wave washer 76, which exhibits a pressing force, for example, another spring member. Housing side coupler 57 is abutted to engaging portion 56 formed in projected hollow portion 54, and held by the pressing force of wave washer 76 against hermetic seal 55. By providing this wave washer 76, it becomes possible to exhibit a vibration resistant function in the vertical direction of housing side coupler 57. It is preferred that a flat washer 77 is interposed between this wave washer 76 and housing side coupler 57, in order to prevent the surface of housing side coupler 57 from being deformed by the pressing force of wave washer 76.

Thus, by providing at least one of the above-described respective vibration resistant means, the vibration resistance for the motor terminal connection section can be improved, and occurrence of breakage or momentary electrical interruption of the terminal connection section can be prevented or suppressed.

INDUSTRIAL APPLICATIONS OF THE INVENTION

The present invention can be applied to any electric compressor incorporating an electric motor for driving a compression mechanism, in particular, can be applied also to an electric compressor of a hybrid compressor in which the respective compression mechanisms are driven by a built-in electric motor and another drive source different therefrom.

The invention claimed is:

1. An electric compressor having a built-in electric motor for driving said compressor and in which a connection section between an external terminal for power supply to said electric motor and an end of a wire from a stator of said electric motor is stored in a compressor housing, characterized in that said connection section is formed from a housing side coupler engaged with said compressor housing, a power supply-external terminal side coupler engaged directly with said housing side coupler at an inner surface of said housing side coupler, and a stator side coupler for holding the end of said wire from said stator, fitted to said power supply-external terminal side coupler, and engaged directly with said housing side coupler at said inner surface of said housing side coupler,
wherein a vibration resistant means for mechanically preventing at least one of wire breakage, momentary electrical interruption and breakage of an insulation member ascribed to vibration is provided at a position of said connection section and/or around said connection section, and
wherein said vibration resistant means has an elastic member that is configured to press said power supply-external terminal side coupler toward the inside of said compressor.

2. The electric compressor according to claim 1, wherein at least one of said housing side coupler, said power supply-external terminal side coupler and said stator side coupler is formed capable of being elastically deformed.

3. The electric compressor according to claim 1, wherein said elastic member is a wave washer.

4. The electric compressor according to claim 1, wherein said connection section is formed in a projected hollow portion which is formed on said compressor housing in which said electric motor is stored and said stator is fixed and which extends outward.

5. The electric compressor according to claim 4, wherein said projected hollow portion is substantially closed against outside of said compressor.

6. The electric compressor according to claim 1, wherein said electric compressor is a hybrid compressor in which a first compression mechanism driven only by a first drive source different from said built-in electric motor and a second compression mechanism driven only by said electric motor provided as a second drive source are provided in parallel and into which both compression mechanisms are incorporated integrally.

7. The electric compressor according to claim 6, wherein said first and second compression mechanisms are scroll-type compression mechanisms, and fixed scrolls of said both compression mechanisms are disposed back to back.

8. The electric compressor according to claim 7, wherein said fixed scrolls disposed back to back are formed from an integral fixed scroll member.

9. The electric compressor according to claim 6, wherein said first drive source is a prime mover for a vehicle.

* * * * *